(No Model.)
M. L. TOLBERT.
STOCK FEEDER.
No. 284,091. Patented Aug. 28, 1883.
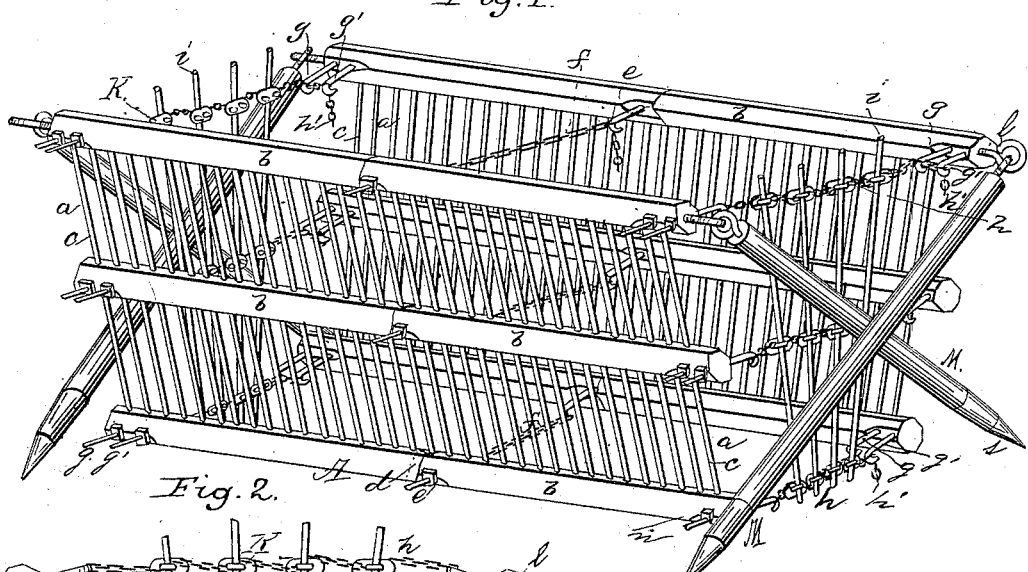
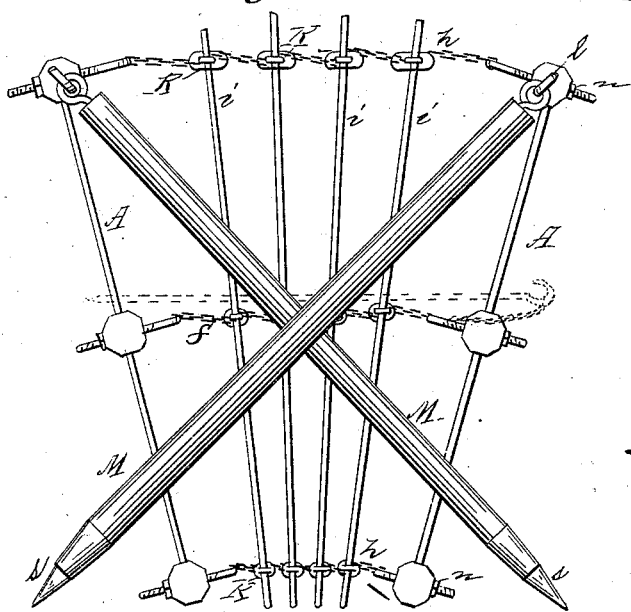
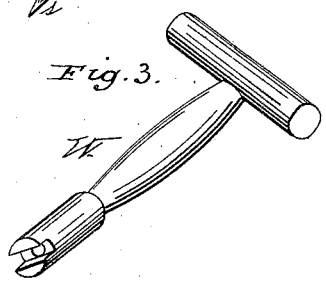
Witnesses:
Inventor:
Attorney.

UNITED STATES PATENT OFFICE.

MARTAIN LUTHER TOLBERT, OF ELDON, IOWA.

STOCK-FEEDER.

SPECIFICATION forming part of Letters Patent No. 284,091, dated August 28, 1883.

Application filed April 23, 1883. (No model.)

*To all whom it may concern:*

Be it known that I, MARTAIN L. TOLBERT, a citizen of the United States of America, residing at Eldon, in the county of Wapello and State of Iowa, have invented certain new and useful Improvements in Stock-Feeders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to portable hay-racks intended to be used for receiving and supporting the hay in condition for feeding, in lieu of stacking it in the ordinary stacks.

In many of the Western States and Territories the production of hay and raising of live-stock is carried on upon such an extended scale that the hand-feeding of hay is impracticable in an economical sense, and it has therefore been the custom to stack the hay in the fields and allow the stock to freely feed therefrom at all times. By this practice a great deal of hay is wasted in being drawn from the stacks and trampled, so that it is unfit for feeding; and other large quantities are loosened and scattered by the winds; and, besides, a considerable loss of stock results from this mode of feeding, as animals are frequently killed by hay-stacks falling, owing to being eaten away below, so that they topple over or are easily blown down upon the animals while feeding or seeking shelter under the lee of the stack in stormy weather.

The object of my invention is to obviate the disadvantages attending the feeding from unprotected stacks, and at the same time to allow the stock to feed freely at all times without personal attention.

With this object in view I have contrived a portable hay-rack, comprising certain novel constructions and combinations of parts, and means, as shown, attached to the lower bars of the side rack, so as to connect the same to each other.

This improved portable hay-rack or stock-feeder will be readily understood from the following particular description, in connection with the accompanying drawings, in which—

Figure 1 is a perspective view of a portable hay-rack or stock-feeder constructed according to my invention. Fig. 2 is an end view of the same. Fig. 3 is a view of the wrench used for erecting the rack or taking it apart. Fig. 4 is a view of the hay-needle.

The side racks are designated by the letter A. In the present instance each side rack is composed of two sections, each of which is indicated by the letter *a;* but I may use either one or any convenient number of such sections at each side of the complete rack, as may be desired. Each section is composed of a suitable number of longitudinal beams, *b,* connected by transverse slats *c,* secured thereto at suitable distances apart, to hold the hay properly in the rack, while at the same time allowing it to readily be drawn out by the stock in suitable quantities for feeding. The inner ends of the section-beams *b* are scarfed, as shown at *d,* to form snug lap-joints, and the lapped ends are provided with coincident bolt-holes to receive the screw-threaded ends of hook-bolts *e,* which serve to connect adjacent sections, and also to hold the brace-chains *f,* which sustain the side racks intermediately against the outward pressure of the hay. The outer ends of the beams *b* are each provided with two bolt-holes, and each of said outer ends is provided with two hook-bolts, *g* and *g'.* Either the hook-bolts *g* or *g'* may be used to engage the cross-chains *h,* which support the end slats, *i,* the object in providing each beam with two hook-bolts being to use one set of the hooks to hold slack end portions, *h',* of the chains *h* while the other set are being detached from the taut chains to allow the rack to expand, and permit the hay to settle down in the rack when it fails to sink properly as it is eaten away below. The end slats, *i,* are secured to the chains *h* by means of suitable clips, K, and may be adjusted as desired by loosening said clips, sliding them along the chains, and again tightening up the nuts *n.* Each of the hook-bolts is provided with a nut, *n,* and these nuts may be removed and replaced by means of a T-shaped wrench, W, (see Fig. 3,) this wrench being the only tool required in erecting the rack and taking it apart.

The letters M M indicate the brace-posts which support the rack against being turned over. These brace-posts have their upper ends connected with the outer ends of the top beams of the side racks, respectively, by means of eye-screws *l*, and each post is provided at its lower end with a spike, *s*, which is adapted to enter the ground and secure the post against lateral displacement. These posts M M are crossed against the ends of the rack, outside of the end chains, *h*, and slats *i*, and so brace the rack firmly without extending unduly outward, and at the same time protect the end chains and slats from being strained by the stock in drawing hay between said end slats.

In first erecting the rack I usually leave a sufficient length, *h'*, of each end chain, *h*, hanging free from its hook-bolt, as shown, and leave off the intermediate brace-chains, *f*; so that the hay may not be obstructed in settling to the bottom of the rack. After the rack is well filled, slightly above the level of the second longitudinal beam from the bottom, I attach a brace-chain to the hook-bolt *e* of such beam on one side, and connect a hay-needle—such as shown at *p*, Fig. 4—to the other end of said chain. Then by passing the needle across through the hay I bring the chain into position to be connected to the opposite bolt-hook. When the rack has been heaped somewhat above the top beams, I then pile on a capping of hay as high as desired. The intermediate brace-chains must of course be also let out when the end chains are extended to expand the rack, and for security I provide the beams *b*, on opposite sides of their junction, with bolt-holes, in which may be placed extra hook-bolts to engage slack portions of the said brace-chains, which may be let out by taking off the nuts and letting loose the bolts engaging the taut chains.

From the foregoing description and explanation it will be seen that, first, animals of any size may feed freely from the rack; second, they will not draw out more hay than they are likely to eat, and therefore no hay will be trampled, soiled, and wasted by the animals; third, the hay is protected against being blown away; fourth, the capping which protects the hay below and is injured by the weather is always the same, and no fresh hay is exposed at the top of the rack; fifth, the stock requires no personal attention while feeding; sixth, the rack may be easily and quickly erected for use in any place desired, and when emptied may be as easily taken apart and stowed away until again required for use.

Having now fully described my invention and explained the manner of constructing and using the same, what I claim is—

1. The combination, with the side racks, of the attached end chains and their connected end slats, and the crossed brace-posts flexibly connected to the side racks at their tops and provide with spikes, substantially as scribed.

2. The combination, with the side racks, of the two sets of hook-bolts at their respective ends, the adjustable end chains, and means, as shown, attached to the lower bars of the side rack, so as to connect the same to each other, substantially as and for the purpose set forth.

3. In a portable hay-rack, the combination of the side racks, constructed as described, the intermediate hook-bolts and brace-chains, the double sets of end hook-bolts, the extensible end chains and their connected slats, and the crossed brace-posts flexibly connected to the side racks, and arranged outside of the end chains and their slats, and means attached to the lower edges of the side racks to prevent the same from separating, substantially as described.

In testimony whereof I affix my signature in presence of two witnesses.

MARTAIN LUTHER TOLBERT.

Witnesses:
A. C. STECK,
I. S. MOORE.